Nov. 4, 1952 W. H. SILVER ET AL 2,616,351
PLOW
Filed Feb. 6, 1945 2 SHEETS—SHEET 2
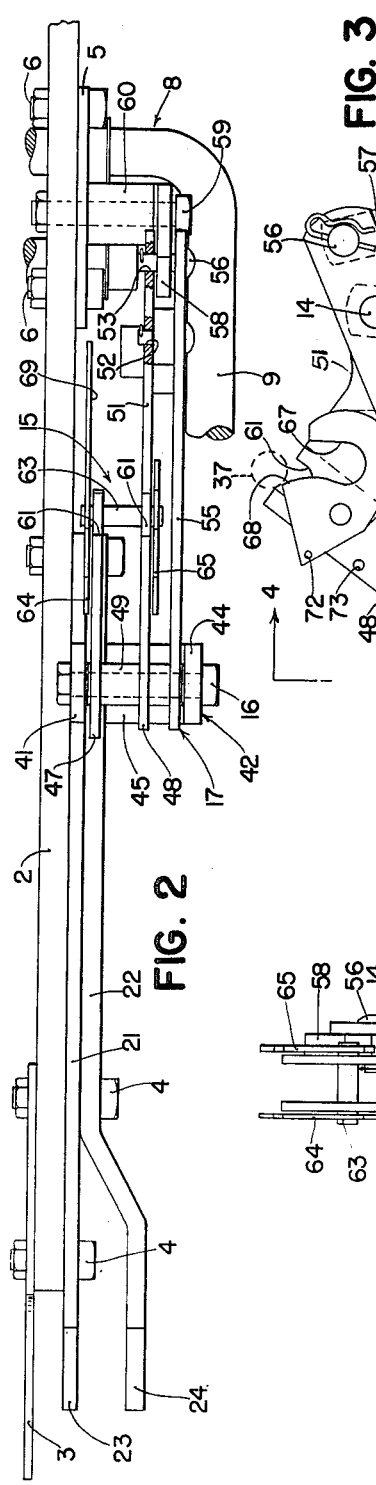
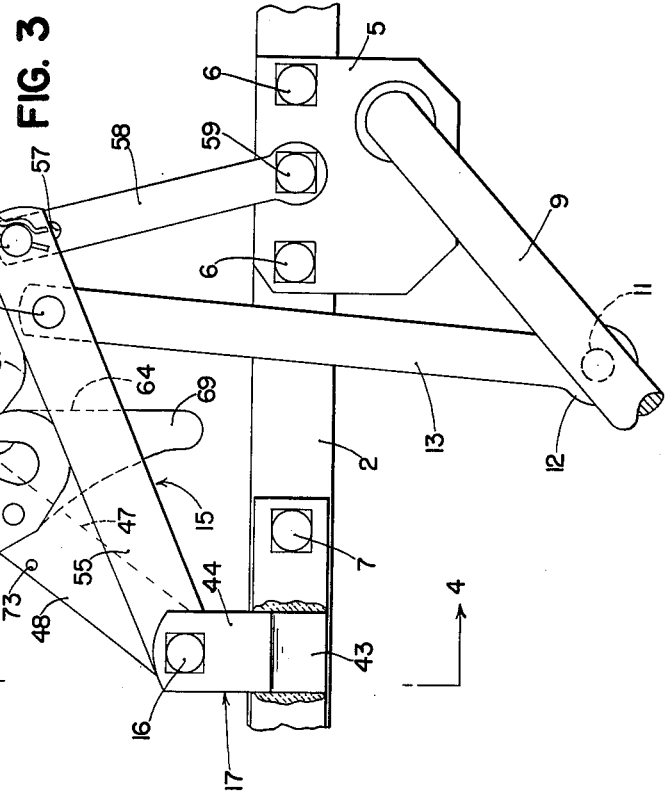
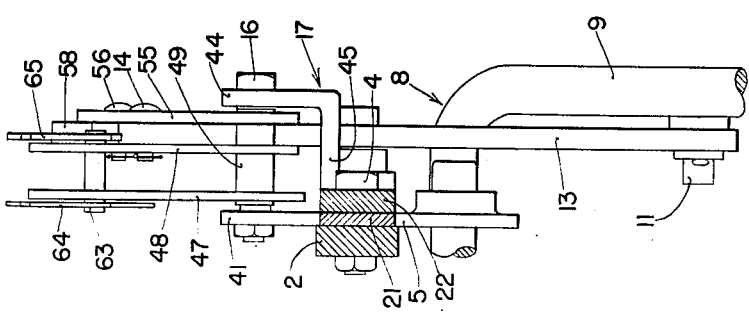
INVENTORS
WALTER H. SILVER
OREY W. OERMAN
BY
ATTORNEYS Patented Nov. 4, 1952

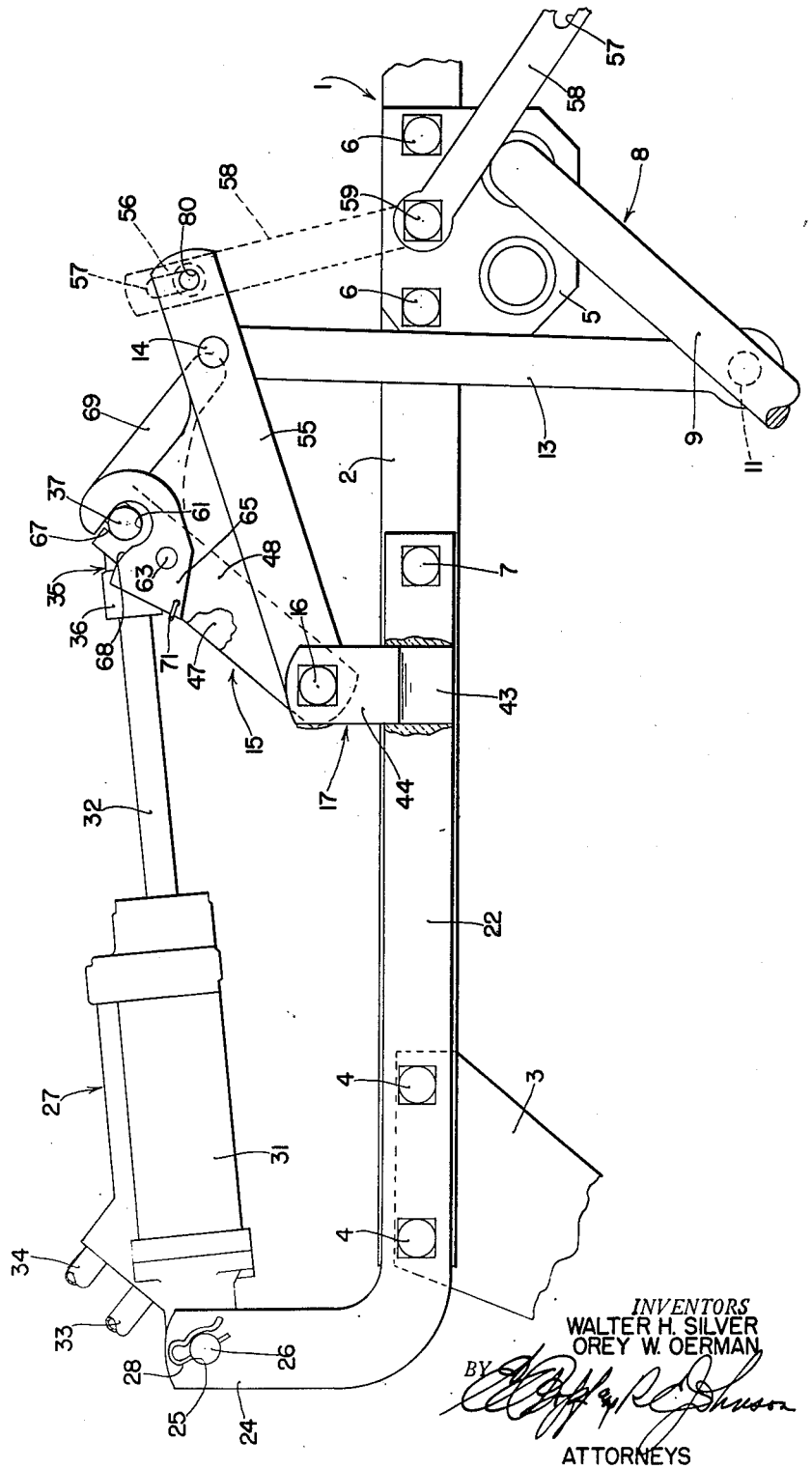

2,616,351

UNITED STATES PATENT OFFICE 2,616,351

PLOW

Walter H. Silver and Orey W. Oerman, Moline, Ill., assignors to Deere & Company, Moline, Ill., a corporation of Illinois Application February 6, 1945, Serial No. 576,498

12 Claims. (Cl. 97—50)

The present invention relates generally to agricultural implements and more particularly to implements having working tools or the like that are raised or lowered by power actuated means.

The object and general nature of the present invention is the provision of new and improved hydraulic lifting and controlling apparatus for farm implements, such as plows and the like, and more particularly it is a feature of this invention to provide a new and improved implement particularly adapted to receive the hydraulic cylinder and piston unit or ram which is operated by fluid under pressure and preferably controlled by suitable valve mechanism on the tractor which propels the implement. Specifically, it is a feature of this invention to provide new and improved means for readily connecting and disconnecting the ram unit with the implement parts without requiring any disconnection of the fluid lines leading to the ram unit. More particularly, it is a feature of this invention to provide quick detachable connections for a ram unit of the double acting type which is connected with the hydraulic piston on the tractor by two lines which ordinarily are never disconnected so that the ram unit always remains with the tractor as a part thereof, as distinguished from arrangements in which a cylinder unit remains on the implement and when the tractor is disconnected it is also necessary to disconnect the hydraulic lines.

These and other objects and advantages of the present invention will be apparent to those skilled in the art after a consideration of the following detailed description of one preferred structural embodiment, illustrated in the accompanying drawings.

In the drawings:

Figure 1 is a side view of my improved hydraulic ram mounting on a plow or similar agricultural implement.

Figure 2 is a top view of the construction shown in Figure 1, the cylinder and piston or ram unit being omitted in order to show the lower parts more effectively.

Figure 3 is a fragmentary side view, showing the rear cylinder mounting in its cylinder releasing position.

Figure 4 is a view taken generally along the line 4—4 of Figure 3.

Referring now more particularly to Figures 1 and 2, the plow in which the principles of the present invention have been incorporated is indicated in its entirety by the reference numeral 1 and comprises one or more plow beams 2 constituting the main portion of the frame of the implement. Draft brackets 3 are fixed, as by bolts 4, to the front end of the beams 2 and, rearwardly thereof, bearing brackets 5 are bolted, as at 6, to receive a part in the form of an associated landwheel crank axle 8 whose position relative to the implement frame is adapted to be adjusted, preferably by power. To this end the crank axle 8 is swingably mounted in the brackets 5 and is provided with a generally downwardly and forwardly extending section 9, the lower end (not shown) of which is provided with suitable journal means receiving the landwheel of the plow. A stud 11 is fixed in any suitable manner to the swinging crank axle section 9 on the inner side thereof and pivotally receives the apertured end 12 of an operating link 13, the upper end of which is pivoted, as at 14, to an arm structure indicated in its entirety by the reference numeral 15. This arm structure 15, together with the link 13 and associated parts, constitutes motion transmitting means actuated by a power unit, described below, for adjusting the position of the part or crank axle 8 relative to the implement frame to which it is movably connected. The arm 15 will be described in detail below and it will therefore suffice for the moment to note that it is pivotally mounted, as at 16, on a bracket 17 carried by the plow frame. The front end of the plow frame includes a pair of forwardly extending brackets 21 and 22, each including a generally longitudinally extending member turned upwardly, as at 23 and 24, at its front end, each upturned end portion being apertured, as at 25, to receive a pivot pin 26 by which a hydraulically operated ram or jack unit 27 is connected thereto. The pin 26 is of the quick detachable type, being releasably held in position by a hairpin fastener 28 of conventional construction, so far as the present invention is concerned.

The hydraulic jack or ram unit 27 is of the double acting type, including a cylinder 31, a piston and piston rod structure 32 and suitable hydraulic conduits 33, 34 leading to opposite sides or ends of the cylinder. The rear end of the piston rod 32 is provided with a head 35 which includes a stop 36 receiving the outer end of the piston rod and a pair of laterally extending trunnions 37, one extending laterally at each side of the head 35.

The power actuated arm 15, movements of which control the swingable landwheel crank axle 8, will now be described. The bracket 17 includes a pair of upstanding members 41 and 42, the member 41 being secured as by welding, directly to the upper end of the inner bracket member 21, adjacent the rear end of the latter, and the other bracket member 42 includes a first section 43 welded or otherwise secured to the outer face of the laterally disposed outer bracket 22 and a laterally outwardly offset section 44, the two sections 43 and 44 being connected by a laterally outwardly extending section 45 (Figure 2). The section 44 and the bracket member 41 are apertured to receive the pivot pin 16 upon which the arm structure 15 is mounted for swinging movement.

As best shown in Figure 2, the arm member 15 includes a pair of swinging members 47 and 48 connected at their forward portions by a journal sleeve 49 to which the plate members 47 and 48 preferably are welded. The sleeve 49 forms a bearing member that is rockably mounted on the bolt 16. The member 47 is formed generally as a flat strap while the member 48 is of generally triangular configuration, the forward apex of which is apertured, like the strap 47, to receive the bearing sleeve 49 to which they are secured. The lower rear portion of the plate member 48 is extended rearwardly along its lower edge section, as indicated at 51 in Figure 2, and is provided with a pair of apertures therein, as indicated at 52 and 53 in Figure 2. These apertures 52 and 53 are in registration with similar apertures formed in an outer bar 55 which also forms a part of the arm structure 15 and is apertured at its forward end to receive the laterally outer end of the associated bearing sleeve 49. The laterally outermost ends of the arms 51 and 55 receive a pin 56 of the quick detachable type which, whenever it is desired to remove the cylinder unit 27, is adapted to be disposed in a slot 57 in a hangup link 58 pivoted, as at 59, to the plow bracket 5. As will be understood, some form of hangup means is required whenever the implement is left standing in raised position and the tractor, together with the cylinder unit 27, disconnected therefrom.

The upper end portion of each of the arm plates 47 and 48 is provided with an upwardly facing notch 61, and forwardly of each notch 61 each plate member 47 and 48 is apertured to receive a pin 63 on which a pair of latch members 64 and 65 are mounted. Each of the latch members 64 and 65 has a slot 67 therein shaped to receive the associated trunnion end 37 when the latter is disposed in the bracket notches 61. Also, each plate member 64 and 65 is provided with a cam section 68 disposed in such position with respect to the pivot pin axis 63 that when the two latch members 64 and 65 are swung rearwardly and downwardly, which may be conveniently accomplished by means of a handle section 69 formed on the latch member 64, the cams 68 serve to force the trunnions 37 out of the bracket notches 61. Thus, the cam 68 constitutes means on the latch members engageable with the trunnion end of the hydraulic unit 27 for releasing the latter from arm 15. Further, when the latch members 64 and 65 are swung into their engaging position, as shown in Figure 1, the notches 67 effectively hold the trunnions 37 in the bracket notches 61, and a quick detachable hairpin fastener 71 is provided and may be inserted through openings 72 and 73 in the latch plates and associated portions of the bracket plates 47 and 48 (see Figure 3).

The operation of our device is substantially as follows.

Figure 1 shows the hydraulic ram unit 27 in operative position, with the front end of the cylinder unit 27 pivotally connected by the pin 26 to the forward brackets 23, 24 and with the rear end of the piston rod 32 held by the trunnions and the locking plates 64 and 65 to the swingable power lift arm 15. During normal plowing, the hangup strap 58 rides loosely in the full line position, as shown in Figure 1, so that by extending or retracting the cylinder unit 27 the arm 15 may be actuated in one direction or the other and, acting through the link 13, serving thereby to rock the landwheel crank wheel axle 8 for the purpose of raising or lowering the frame relative to the ground. The power for operating the ram unit 27 is delivered thereto through the hydraulic conduits 33 and 34 which are permanently connected with the hydraulic mechanism on the tractor that propels the plow.

When it is desired to disconnect the plow from the tractor it is, of course, desirable to remove the cylinder unit 27 from the implement in order, first, not to have to disconnect the hose lines 33 and 34, and, second, in order to use the cylinder 27 for some other implement or some other purpose. In disconnecting the implement from the tractor and the cylinder 27 from the implement, the operator first extends the ram unit to fully raise the plow, this being the position shown in full lines in Figure 1. The operator then swings the hangup link 58 around in its dotted line position, thus bringing the slot 57 over into a position registering with the opening 80 in the rear end of the arm section 55 and the registering opening 53 (Figure 2) in the arm section 51. In Figure 2, the hangup link 58 is shown in its plow supporting position. After the openings 53 and 80 are brought into registration, the quick detachable pin 56 is inserted through the openings and also through the slot 57. Next the power lift cylinder is operated in the lowering direction a distance sufficient to cause the weight of the frame and associated parts, which act to push up through the link 13 against the arm 55, to be supported by the pin 56 being held against the outer end of the slot 57 in the holdup link 58, as shown in Figure 3. Due to the fact, however, that the cylinder unit 27 is a double acting device it is necessary to force the trunnion members 37 rearwardly out of the notches 61, and this may be done easily and conveniently by swinging the latch members 64, 65 downwardly, as by swinging the handle section 69 downwardly. This causes the cams 68 to shift the trunnions a slight amount rearwardly, sufficient to bring the arm portion of the trunnions up above the adjacent corner or edge of the associated notches 61. The rear end of the piston rod then snaps out of its seat in the notches 61. Before swinging the latch member downwardly and rearwardly it is, of course, necessary to remove the detachable fastener 71. After the rear end of the piston 32 has been disconnected from the arm 15, as described above, it is then a simple matter to remove the quick detachable pin 26, whereupon the cylinder unit 27 is entirely disconnected from the implement.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement having a part to be adjusted and a hydraulic unit for adjusting said part, quick detachable means for releasably connecting said hydraulic unit with the implement, comprising a member having a notch to receive a portion of said hydraulic unit, a latch engageable with said hydraulic unit portion for holding the latter in said notch, and cam means on said latch operable by movement of the latter into its releasing position for positively disengaging said hydraulic unit from said notch.

2. In an agricultural implement having a detachable hydraulic cylinder unit having a piston rod and having outwardly extending trunnion means thereon, a quick detachable connection for connecting the cylinder unit to the implement through said trunnion means, comprising a notched part to receive said trunnion means, a latching hook pivoted to said part for holding said trunnion means therein, and means on the latching hook for forcing said trunnion means out of engagement with said notched part against resistance to the removal of said trunnion means therefrom.

3. In an agricultural implement having a part to be adjusted and normally biased for movement in one direction, a swingable arm connected with said part for adjusting it, a power operated unit detachably connected with said arm and adapted, when attached thereto, to shift said arm, means carried by the latter and having an opening therein, a link movably connected with said implement and shiftable to carry a portion into a position alongside the apertured part of said arm means, said portion of said link having an opening therein adapted to register with said first opening, and means insertable into said registering openings for holding said arm against movement in said one direction when said power operated unit is disconnected therefrom.

4. In an agricultural implement having a swingable crank axle, a swingable arm, means connecting said swingable arm with said crank axle, means serving as a frame to which said crank axle and arm are swingably connected, said arm having a notch therein, and a double acting hydraulic power operated unit detachably connected at one end with said frame, so as to be anchored thereto, and having a part at its other end adapted to be seated in said notch, the combination therewith of latch means for holding said part in said notch, whereby operation of said hydraulic unit acts to swing said arm and said crank axle, means optionally connecting said arm with said frame to prevent movement of the latter relative to said crank axle when said hydraulic unit is detached, and means operated by movement of said latch means for disengaging said hydraulic unit part from said notch.

5. In an agricultural implement having a swingable crank axle, a swingable arm, means connecting said swingable arm with said crank axle, means serving as a frame to which said crank axle and arm are swingably connected, said arm having a notch therein, and a double acting hydraulic power operated unit detachably connected at one end with said frame, so as to be anchored thereto, and having a part at its other end adapted to be seated in said notch, the combination therewith of latch means for holding said part in said notch, whereby operation of said hydraulic unit acts to swing said arm and said crank axle, means optionally connecting said arm with said frame to prevent movement of the latter relative to said crank axle when said hydraulic unit is detached, and means for locking said latch to said arm with said hydraulic unit part seated in said notch.

6. In an agricultural implement comprising a part adapted to be shifted between a raised and a lowered position, corresponding to a raised and lowered position of the implement, and normally tending to move toward said lowered position, a power operated double acting hydraulic unit for shifting said part from said lowered position to said raised position, and means for releasably connecting said hydraulic unit with said part, optionally connectible means extending between said implement and said part for holding the latter against movement away from said raised position when said hydraulic unit is removed, said optionally connectible means comprising a transport latch including a pair of relatively shiftable members, one connected with said part and movable therewith and the other connected with said implement, said members being adapted to overlap in said raised position and the overlapping portions having registering openings, and interlocking means insertable into said openings when they are in registration, one of said openings being larger than said interlocking means so as to accommodate variations in the raised position of said implement part without interfering with the insertion of said interlocking means.

7. In an agricultural implement having a part to be adjusted, motion-transmitting means operatively connected with said part, and a double acting hydraulic ram unit for operating said motion-transmitting means, the combination therewith of a releasable latch for releasably connecting one end of said hydraulic ram unit to said motion-transmitting means, and means on said latch and operated by the movement thereof into a released position for engaging said one end of said hydraulic ram unit for shifting the latter into a position to accommodate disconnecting said hydraulic ram unit from said motion-transmitting means.

8. In an agricultural implement having a part to be adjusted and a hydraulic unit for adjusting said part, quick detachable means for releasably connecting said hydraulic unit with the implement, comprising a member having a notch to receive a portion of said hydraulic unit, a latch engageable with said hydraulic unit portion for holding the latter in said notch, and means movable with said latch and operable by movement of the latter into its releasing position for positively disengaging said hydraulic unit part from said notch.

9. In an agricultural implement having a part to be adjusted and a hydraulic unit for adjusting said part, quick detachable means for releasably connecting said hydraulic unit with the implement, comprising a member having a notch to receive a portion of said hydraulic unit, motion-transmitting means adapted to connect said notched member with said implement part for adjusting the latter, a latch engageable with said hydraulic unit portion for holding the latter in said notch, and cam means on said latch operable by movement of the latter into its releasing position for positively disengaging said hydraulic unit portion from said notch.

10. In an agricultural machine having a frame and a part to be adjusted relative thereto and normally biased for movement in one direction, a swingable arm connected with said part for shifting the latter, a power-operated unit, means for detachably connecting said unit with the said arm and adapted, when connected therewith, to shift said arm and said implement part for adjusting the latter, apertured means on said arm and apertured means on said frame adapted to be brought into a position in which the apertures thereof are in registry when said power-operated unit is operated in said other direction, and means insertable into said registering apertures for holding said arm and said implement part against movement in said one direction when said power-operated unit is disconnected therefrom.

11. The invention set forth in claim 10, further characterized by the means detachably connecting said power-operated unit with said arm including a part movable on said arm and connectible with one end of said power operated unit, said part and the adjacent portion of said arm being apertured and the apertures being adapted to be brought into registry, and means insertable into said last-mentioned registering openings for retaining said power-operated unit in a position to transmit power to said arm in either direction.

12. In an agricultural implement having a part to be shifted and a hydraulic power unit for shifting said part, the combination of motion-transmitting means adapted to be connected with said part for shifting the latter and including a notched portion adapted to receive one end of the hydraulic power unit, a releasable latch movably carried by said motion-transmitting means for releasably holding said end of the hydraulic unit in said notch, and means connected with and operated by movement of said releasable latch into a released position and engageable with said end of said hydraulic unit for shifting the latter into a position to accommodate disconnectng said hydraulic unit from said notch.

WALTER H. SILVER.
OREY W. OERMAN.

REFERENCES CITED

The following references are of record in the file of this patent:

UNITED STATES PATENTS

| Number | Name | Date |
| --- | --- | --- |
| Re. 22,932 | Acton | Nov. 11, 1947 |
| 1,646,343 | Beltz | Oct. 18, 1927 |
| 2,094,413 | Schonitzer | Sept. 28, 1937 |
| 2,292,961 | Mott | Aug. 11, 1942 |
| 2,324,840 | Hipple | July 20, 1943 |
| 2,330,304 | Mott | Sept. 28, 1943 |
| 2,344,123 | Brown et al. | Mar. 14, 1944 |
| 2,369,437 | Court | Feb. 13, 1945 |

FOREIGN PATENTS

| Number | Country | Date |
| --- | --- | --- |
| 30,088 | Sweden | Jan. 7, 1911 |